United States Patent [19]

Packington

[11] 4,417,751
[45] Nov. 29, 1983

[54] PASSIVE SAFETY BELT SYSTEM

[75] Inventor: Simon D. Packington, Bognor Regis, England

[73] Assignee: Britax (Wingard) Limited, Chichester, England

[21] Appl. No.: 298,357

[22] Filed: Sep. 1, 1981

[30] Foreign Application Priority Data

Oct. 29, 1980 [GB] United Kingdom ............... 8034787

[51] Int. Cl.³ .............................................. B60R 21/10
[52] U.S. Cl. ................................... 280/802; 280/803; 280/804; 297/468
[58] Field of Search ............... 280/802, 803, 804, 807, 280/808; 297/468, 469, 481

[56] References Cited

U.S. PATENT DOCUMENTS

| 4,213,637 | 7/1980 | Mauron | 280/802 |
| 4,256,330 | 3/1981 | Geoffrey | 280/802 |
| 4,268,067 | 5/1981 | Thomas | 280/802 |
| 4,324,418 | 4/1982 | Stephenson | 280/802 |
| 4,345,780 | 8/1982 | Moriya | 280/802 |

Primary Examiner—Bruce H. Stoner, Jr.
Assistant Examiner—John A. Carroll
Attorney, Agent, or Firm—Hayes, Davis & Soloway

[57] ABSTRACT

A passive safety belt system consists of a lap strap (14), a shoulder strap (16) and a common strap (20) interconnected to form a 3-point safety belt with the free ends of the lap and shoulder straps (14 & 16) connected to the rear edge of a vehicle door (26) and the free end of the common strap (20) connected to an inertia reel. A flexible element (30) interconnects the junction of the three straps (14, 16 & 20) of the safety belt with a traveller (36) on the track (38). An arm (46) has a loop (48) at one end, through which the common strap (20) runs. The other end of the arm (46) is pivotally mounted on the front inboard corner of a seat (10), a stop member (50) on the common strap (20) engages with the loop (48) to lift the arm (46) when a predetermined length of said common strap has been pulled off the inertia reel (28).

3 Claims, 5 Drawing Figures

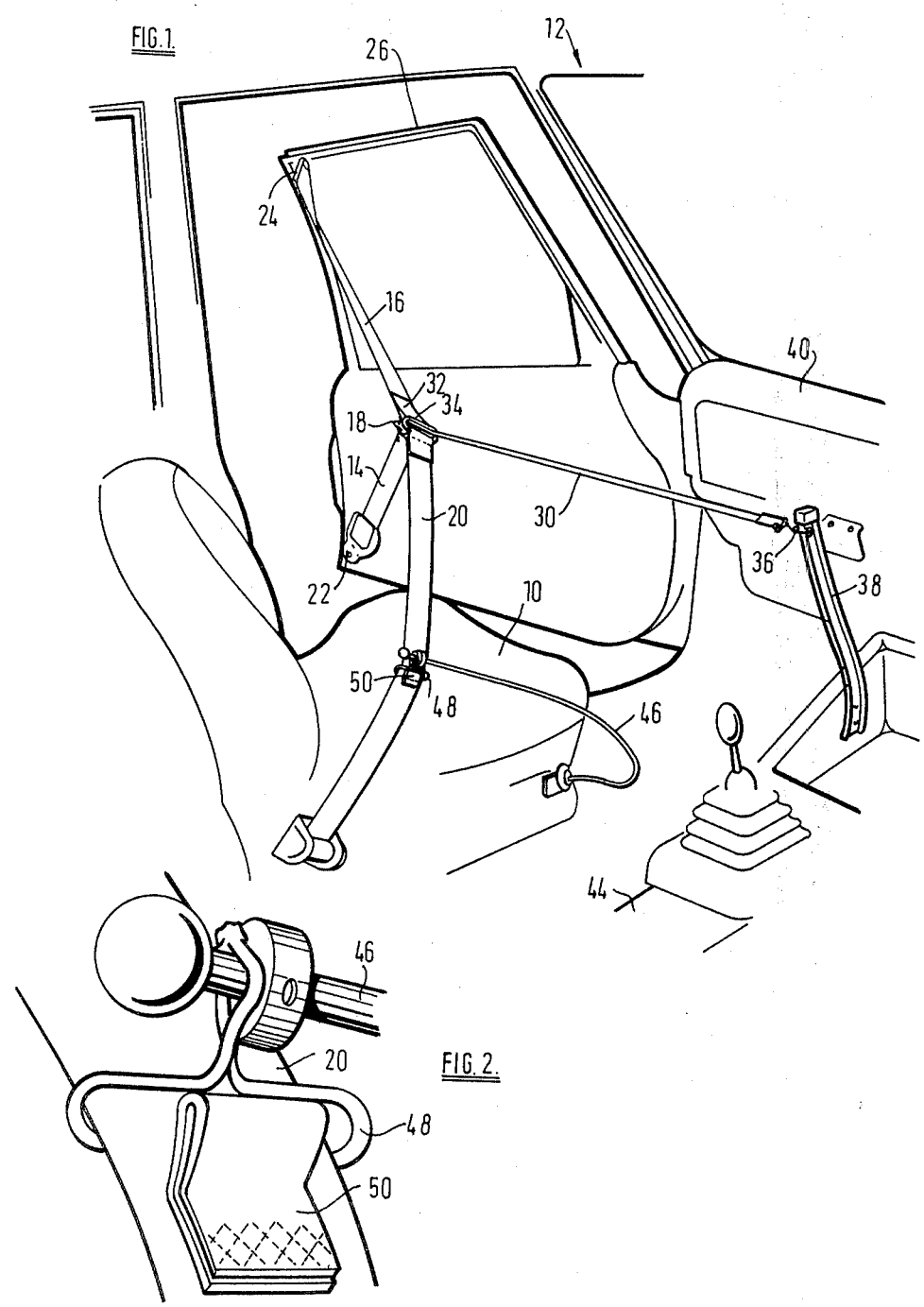

PASSIVE SAFETY BELT SYSTEM

This invention relates to a passive safety belt system for a motor vehicle of the type in which the belt is moved away from the body of the user when the corresponding vehicle door is opened.

U.S. Application Ser. No. 256,530 relates to a motor vehicle having a front-hinged door and an adjacent seat provided with a safety belt system comprising a shoulder strap, a lap strap and a common strap inter-connected to form a three-point safety belt, the free ends of the shoulder, lap and common straps being connected to respective anchorage means, one of which incorporates an inertia reel, the anchorage means for the lap strap and the common strap means each being connected to a respective one of the first point on the door in proximity to the bottom rear corner thereof and a location on the vehicle inboard of and adjacent to the bottom of the back of the seat and the anchorage means for the shoulder strap being connected to a point above the anchorage means for the lap strap such that its location relative to the anchorage for the lap strap is not effected by opening of the door, the safety belt system further comprising puller means interconnecting a point on the safety belt with a point on the vehicle such that, when the door is opened the puller means applies a force to the shoulder strap thereby to displace the junction between the lap, shoulder and common straps out of the plane containing the two anchorage means and the guide means in a direction away from the seat.

When the invention described in the foregoing application is applied to a safety belt system of the type in which the lap and shoulder straps are attached to the rear edge of the door, the puller means may be arranged to interconnect a point on the safety belt which is inboard of the seat when the door is closed and a point on the vehicle in front of and above the knees of an occupant of the seat. The present invention is concerned with an improvement in or modification of a safety belt system of this type.

According to the present invention, a motor vehicle has a front-hinged door and an adjacent seat provided with a safety belt system comprising a shoulder strap, a lap strap and a common strap interconnected to form a three-point safety belt, the free ends of the shoulder and lap straps being connected to the rear edge of said door in proximity to the top and bottom corners thereof and the free end of the common strap being guided, at a location inboard of and adjacent to the bottom of the back of the seat, on to an inertia reel, the system further comprising puller means interconnecting a point on the safety belt which is inboard of the seat when the door is closed and a point on the vehicle in front of and above the knees of an occupant of the seat, an arm of which one end has an aperture through which the common strap runs and the other end is mounted for angular movement about a horizontal axis adjacent to the front inboard corner of the seat, the inboard end of said axis being in fornt of the outboard end thereof so that said aperture is movable between a first position adjacent to the location of which said common strap is guided on to the inertia reel and a second position above and outboard of said first position, and stop means on said common strap adapted to engage with said aperture to lift said arm from its first position to its second position when a pre-determined length of said common strap has been pulled off the inertia reel.

In one form of the invention, the puller means comprises a flexible element made, for example, of webbing or cord.

An embodiment of the invention will now be described, by way of example, with reference to the accompanying drawings, in which:

FIG. 1 is a perspective view of part of the interior of a motor car having a seat fitted with a safety belt system in accordance with the invention, with the door adjacent to such seat open;

FIGS. 2, 3 and 4 illustrate on an enlarged scale, details of the safety belt system shown in FIG. 1.

Figure 3:
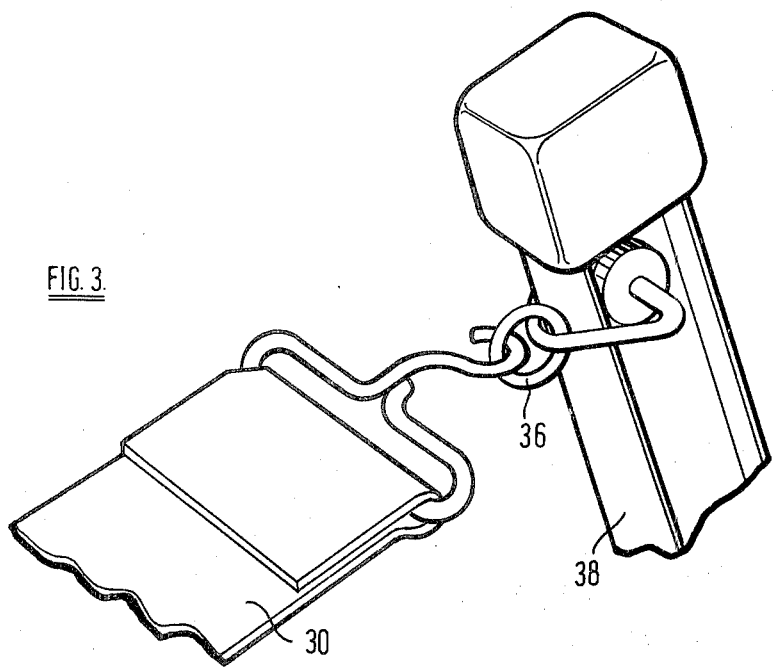

FIG. 1 shows one of the front seats 10 of a motor car 12 in accordance with the invention. A safety belt for the occupant of the seat 10 consists of a single length of webbing, forming the lap element 14 and the shoulder element 16, which runs freely through a flattened ring 18 which is in turn connected to one end of another length of webbing forming the common element 20 of the safety belt. The free ends of the lap and shoulder elements 14 and 16 are connected to respective anchorages 22 and 24 near the bottom and top rear corners of the adjacent door 26 of the car 12. The free end of the common element 20 is connected to an inertia reel 28 mounted on the front of the car on the inboard side of the seat 10 and adjacent to the back thereof.

Figure 4:
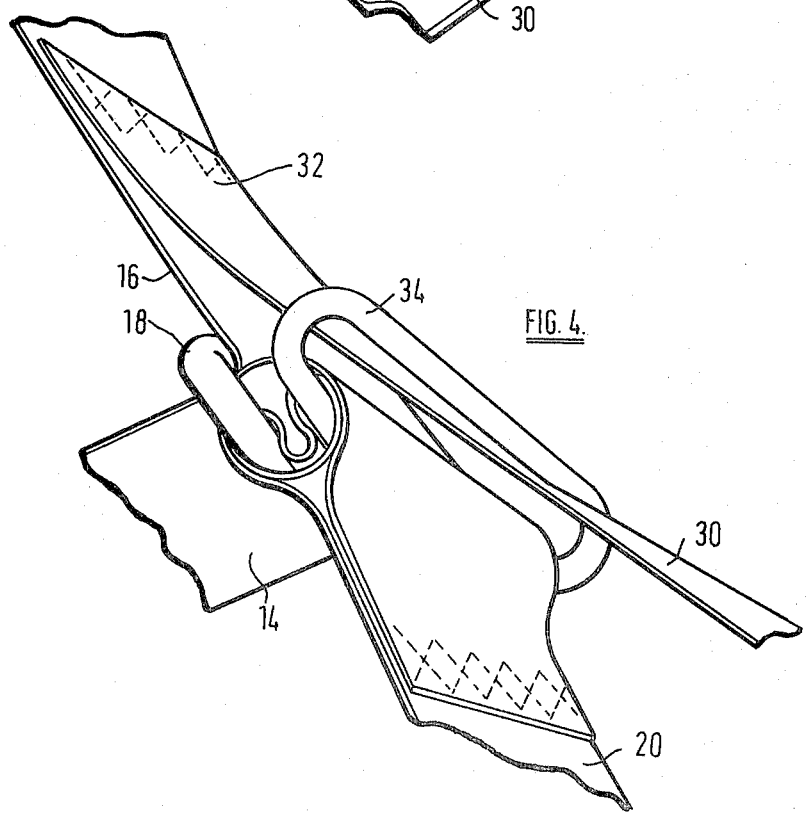

A piece of webbing 30 has one end attached to a location 32 (FIG. 4) on the shoulder element 16 spaced from the ring 18. It runs through a second flattened ring 34, also attached to the free end of the common element 20, and is then connected to a traveller 36 (FIG. 3) mounted on a track 38 which extends from the fascia 40 of the car 12 downwards towards the transmission tunnel 44 thereof.

An arm 46 is pivotally mounted on the front inboard corner of the seat 10 for angular movement about a horizontal axis, the inboard end of which is in front of the outboard end thereof. On its free end, the arm 46 has a freely pivoting loop 48 (FIG. 2) through which the common element 20 is threaded before it is lead on to the inertia reel 28. A stop element 50 is sewn on to the common element 20 so that, when it abuts against the loop 48 as webbing is drawn off the inertia reel 28, the arm 46 is lifted from a position in which the loop 48 is in close proximity to the inertia reel 28. The arm 46 is shaped so that such movement can be performed without fouling the front corner of the seat 10.

Figure 5:
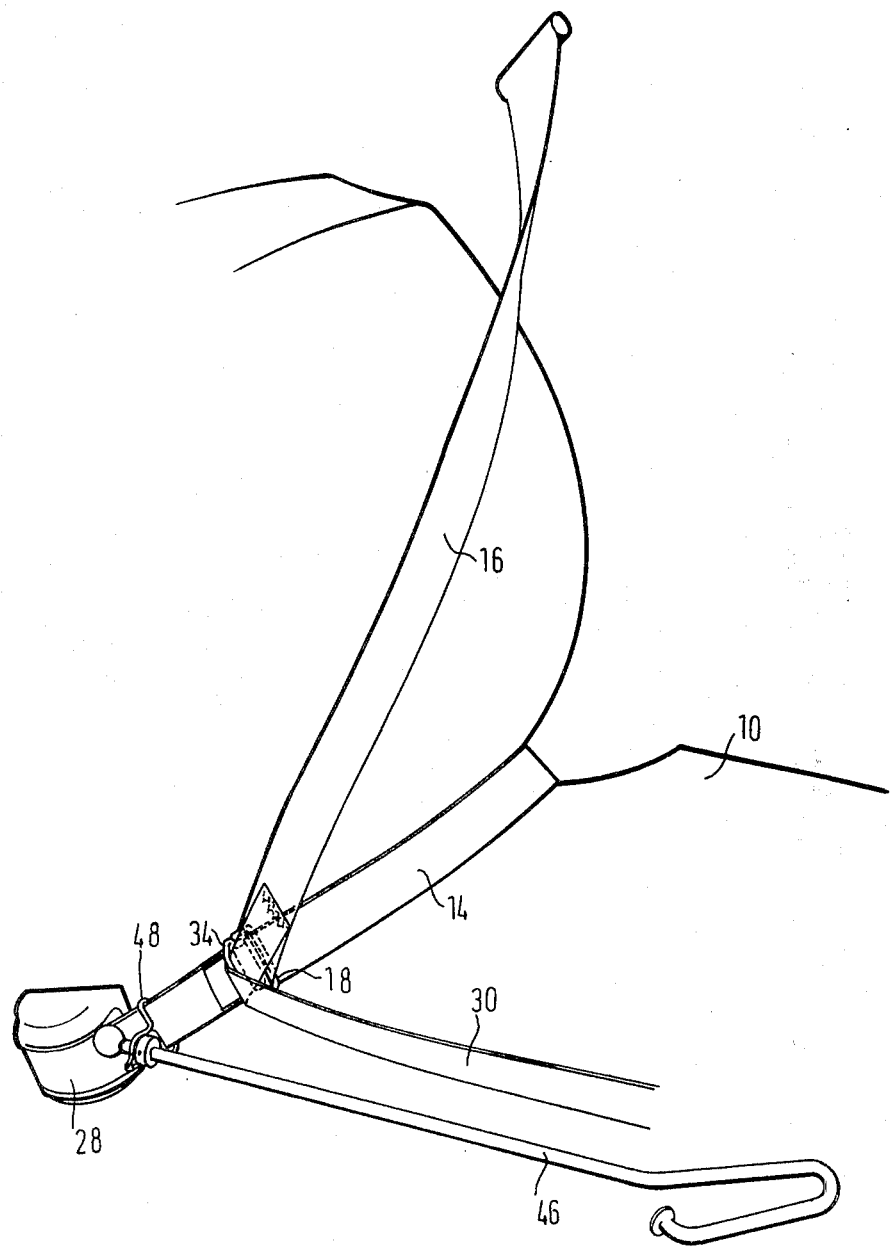
FIG. 5 is a perspective view of the safety belt system and seat shown in FIG. 1 in the position which it occupies when the adjacent door is closed.

In use, when the door 26 is closed, the various elements 14, 16 and 20 of the safety belt system take up the configuration shown in FIG. 5. The elements 14, 16 and 20 are in the position of normal use while the arm 46 and the length of webbing 30 lie alone or in close proximity to the transmission tunnel 44.

When the door 26 is opened, the resulting pull on the lap and shoulder elements 14 and 16, particularly the latter, causes webbing to be drawn off the reel 28. As the piece of webbing 30 tightenes, it pulls the traveller 36 to the top of the track 38. Thereafter, the tension in the shoulder element 16 and the piece of webbing 30 tends to lift the ring 18 away from the seat 10.

At the same time, as soon as sufficient webbing is drawn off the reel 28 for the stop 50 to engage with the loop 48, the arm 46 tends to lift. The orientation of its pivotal axis ensures that an outward force, towards the door 26, tends to assist this lifting movement. The result is that, instead of running straight from the position occupied by the ring 18 to the reel 28 when the door 26 is opened, the intermediate part of the common element 20 is held further away from the seat 10.

When the car door 26 closes again, the retractor spring of the reel 28 causes the common element 20 to be rewound on to the reel, thereby allowing the piece of webbing 30 and the arm 46 to return to the positions illustrated in FIG. 5. The distance between the inertia reel 28 and the pivot axis of the arm 46 is chosen to optimise the extent to which the common element 20 is lifted away from the seat 10. Consequently, in order to maintain this optimum arrangement, both the reel 28 and the pivot axis of the arm 46 are mounted at a fixed spacing on means movable simultaneously with the seat 10.

I claim:

1. A motor vehicle having a front-hinged door and an adjacent seat provided with a safety belt system comprising a shoulder strap, a lap strap and a common strap interconnected to form a three-point safety belt, the free ends of the shoulder and lap straps being connected to the rear edge of said door in proximity to the top and bottom corners thereof and the free end of the common strap being guided, at a location inboard of and adjacent to the bottom of the back of the seat, on to an inertia reel, the system further comprising puller means interconnecting a point on the safety belt which is inboard of the seat when the door is closed and a point on the vehicle in front of and above the knees of an occupant of the seat when the door is open, an arm of which one end has an aperture through which the common strap runs and the other end is mounted for angular movement about a horizontal axis adjacent to the front inboard corner of the seat, the inboard end of said axis being in front of the outboard end thereof so that said aperture is movable between a first position adjacent to the location of which said common strap is guided on to the inertia reel and a second position above and outboard of said first position, and stop means on said common strap adapted to engage with said aperture to lift said arm from its first position to its second position when a pre-determined length of said common strap has been pulled off the inertia reel.

2. A motor vehicle according to claim 1, wherein the puller means comprises a flexible element.

3. A motor vehicle according to claim 2, wherein the point on the vehicle to which the puller means is attached comprises a traveller on a vertically extending track.

* * * * *